(12) United States Patent
Kuroda

(10) Patent No.: US 10,958,124 B2
(45) Date of Patent: Mar. 23, 2021

(54) MOTOR

(71) Applicant: MINEBEA MITSUMI INC., Nagano (JP)

(72) Inventor: Minoru Kuroda, Sakaiminato (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 463 days.

(21) Appl. No.: 15/483,622

(22) Filed: Apr. 10, 2017

(65) Prior Publication Data

US 2017/0302131 A1    Oct. 19, 2017

(30) Foreign Application Priority Data

Apr. 15, 2016    (JP) .............................. JP2016-082242

(51) Int. Cl.

| | |
|---|---|
| *H02K 5/04* | (2006.01) |
| *H02K 5/14* | (2006.01) |
| *H02K 5/15* | (2006.01) |
| *H02K 5/22* | (2006.01) |
| *H02K 7/08* | (2006.01) |
| *H02K 11/026* | (2016.01) |

(52) U.S. Cl.
CPC ............... *H02K 5/225* (2013.01); *H02K 7/08* (2013.01); *H02K 5/04* (2013.01); *H02K 5/14* (2013.01); *H02K 5/15* (2013.01); *H02K 11/026* (2013.01)

(58) Field of Classification Search
CPC .......... H02K 23/04; H02K 5/22; H02K 5/225; H02K 5/14; H02K 5/15; H02K 5/16; H02K 5/04; H02K 11/026; H02K 11/30; H02K 11/33; H02K 11/215; H02K 1/17; H02K 21/26; H01R 39/385

USPC ............ 310/89, 239–249, 71, 154, 401, 418
See application file for complete search history.

(56) References Cited

U.S. PATENT DOCUMENTS

| | | | |
|---|---|---|---|
| 6,465,927 B2 * | 10/2002 | Shiraki | H02K 5/145 310/239 |
| 2002/0050759 A1 | 5/2002 | Shiraki et al. | |
| 2002/0117914 A1 * | 8/2002 | Doi | H02K 5/161 310/68 R |
| 2002/0175573 A1 | 11/2002 | Hayashi | |
| 2005/0023917 A1 * | 2/2005 | Kesting | H02K 23/04 310/156.43 |

(Continued)

FOREIGN PATENT DOCUMENTS

| | | |
|---|---|---|
| CN | 87104183 A | 12/1987 |
| CN | 1351405 A | 5/2002 |

(Continued)

OTHER PUBLICATIONS

Nov. 5, 2019 Office Action issued in Japanese Patent Application No. 2016-082242.

(Continued)

*Primary Examiner* — Quyen P Leung
*Assistant Examiner* — Alexander Moraza
(74) *Attorney, Agent, or Firm* — Oliff PLC

(57) ABSTRACT

A motor includes a rotor, a frame accommodating the rotor, a cover provided at one of two ends of the frame in a direction of a rotor axis, an internal space formed by the frame and the cover and a partition part partitioning the internal space into two spaces. The partition part includes an insertion portion. A part of the cover is inserted into the insertion portion.

12 Claims, 16 Drawing Sheets

(56) References Cited

U.S. PATENT DOCUMENTS

| | | | | |
|---|---|---|---|---|
| 2012/0104887 A1* | 5/2012 | Tanaka | ................... | H02K 5/08 |
| | | | | 310/88 |
| 2012/0205993 A1* | 8/2012 | Tanaka | ................... | H02K 5/225 |
| | | | | 310/43 |
| 2016/0036304 A1 | 2/2016 | Yamasaki et al. | | |
| 2016/0134073 A1 | 5/2016 | Tokizaki et al. | | |
| 2018/0093698 A1* | 4/2018 | Urimoto | ................ | H02K 11/21 |
| 2019/0016371 A1* | 1/2019 | Urimoto | ................ | H02K 5/225 |

FOREIGN PATENT DOCUMENTS

| | | | |
|---|---|---|---|
| CN | 105379083 A | 3/2016 |
| JP | H09-322468 A | 12/1997 |
| JP | 2003-102148 A | 4/2003 |
| JP | 2010-226805 A | 10/2010 |
| JP | 2013-099094 A | 5/2013 |
| JP | 2016-036246 A | 3/2016 |

OTHER PUBLICATIONS

Aug. 27, 2019 Office Action issued in Chinese Patent Application No. 201710242536.8.

Jun. 18, 2019 Notification of Reason for Refusal issued in Japanese Patent Application No. 2016-082242.

May 25, 2020 Office Action issued in Chinese Patent Application No. 201710242536.8.

* cited by examiner

MOTOR

CROSS REFERENCE TO RELATED APPLICATIONS

This application claims the benefit of Japanese Patent Application No. 2016-082242, filed Apr. 15, 2016, which is hereby incorporated by reference in its entirety.

BACKGROUND

Technical Field

The present disclosure relates to a motor.

Background

A direct current (DC) motor mainly includes a frame, an armature (rotor), a bracket, and a bottom plate. The frame is a member for covering the outside of the DC motor, and is provided in its inside with a magnet, a bearing, and the like. The armature includes a shaft, a core fixed to the shaft, a coil, a commutator, and the like. The bracket includes a brush for supplying electrical current to the coil through the commutator, for example. The bottom plate includes a bearing provided on a non-output side with respect to the core to rotatably support the shaft, for example.

Some DC motors further include a control signal forming unit provided with a frequency generator (FG) magnet, an encoder, a circuit as a countermeasure for electromagnetic interference (EMI), and the like, the control signal forming unit being provided on a non-output side with respect to the bottom plate. This kind of DC motor further includes a protection cover for covering the control signal forming unit. The protection cover is fixed to the frame by fitting projecting portions provided at an end of the protection cover on an output side in the corresponding notches provided at an end of the frame on a non-output side.

A conventional motor is disclosed in Japanese Patent Application Laid-Open No. 09-322468, for example.

Japanese Patent Application Laid-Open No. 09-322468 discloses sound insulation structure of a motor in which an end frame made of resin integrally molded with a brush holder is fixed to a housing by being crimped. The end frame is fixed to the housing by using four projecting portions formed in the housing. Each of the projecting portions is provided with a notch, and is bent such that the notch is widened in the corresponding one of recessed portions provided in an outer peripheral edge of the end frame.

In a conventional motor, since each of members constituting a frame and a protection cover has a thin thickness, fitting force between projecting portions of the protection cover and notches of the frame is small to cause the protection cover to be liable to come off, for example.

The present disclosure is related to proving a motor in which a cover can be prevented from coming off from a frame.

SUMMARY

A motor according to an aspect of the present disclosure may include a rotor, a frame accommodating the rotor, a cover provided at one of two ends of the frame in a direction of a rotor axis, an internal space formed by the frame and the cover, and a partition part partitioning the internal space into two spaces. The partition part may include an insertion portion. A part of the cover is inserted into the insertion portion.

The above motor may include a shaft as a rotating axis of the rotor. The partition part may include a bearing, a bearing holding portion holding the bearing, and a hole provided inside an inner surface of the bearing holding portion. The shaft may be inserted into the hole.

In the above motor, the frame may include a cylindrical frame body having two ends, and a stepped portion is provided in an inner surface of the one end of the frame body, the cover may include a cylindrical cover body, and a projecting portion is provided at the cover body, the projecting portion projects from the cover body toward the frame body, and the projecting portion may be provided in the insertion portion and inside the stepped portion.

In the above motor, the insertion portion may be a notch provided in an outer periphery of the partition part, and the projecting portion may be provided in a hole formed with the frame and the notch.

In the above motor, the partition part may include a substantially circular plane shape, and the plane shape may include a recessed portion. The recessed portion is recessed inward.

The above motor may include a base plate fixed to the partition part. The base plate may be disposed on a cover side with respect to the partition part.

In the above motor, the partition part may include the insertion portion as a first insertion hole and a second insertion hole, and a fixture fixing the base plate to the partition part may be inserted into the second insertion hole.

In the above motor, the cover may include a first conducting wire insertion hole provided on one end side of the cover in a direction of the rotating axis, and electric power is supplied via a conducting wire to the base plate from outside the internal space. The conducting wire may be inserted into the first conducting wire insertion hole.

The above motor may include a bracket fixed to the frame in a space on the one side. The bracket may include a projecting portion, a brush, a second conducting wire insertion hole provided in the projecting portion, and a conducting wire. Electric power is supplied via the conducting wire to the brush from the base plate, and the conducting wire may be inserted into the second conducting wire insertion hole, and the partition part may include a fitting hole into fitted into the projecting portion.

According to the present disclosure, it is possible to provide a motor including a cover, the cover can be prevented from coming off from a frame.

DETAILED DESCRIPTION

An embodiment of the present disclosure will be described below with reference to drawings.

In the present embodiment, for an example, the motor as a DC brush motor will be described. The motor may include a frame and a cover. The cover forms an internal space for accommodating a rotor. While a DC brush motor (a motor with a brush) is described in the present embodiment, a motor is not limited to a DC brush motor, and a brushless motor and a stepping motor are applicable.

Figure 1:
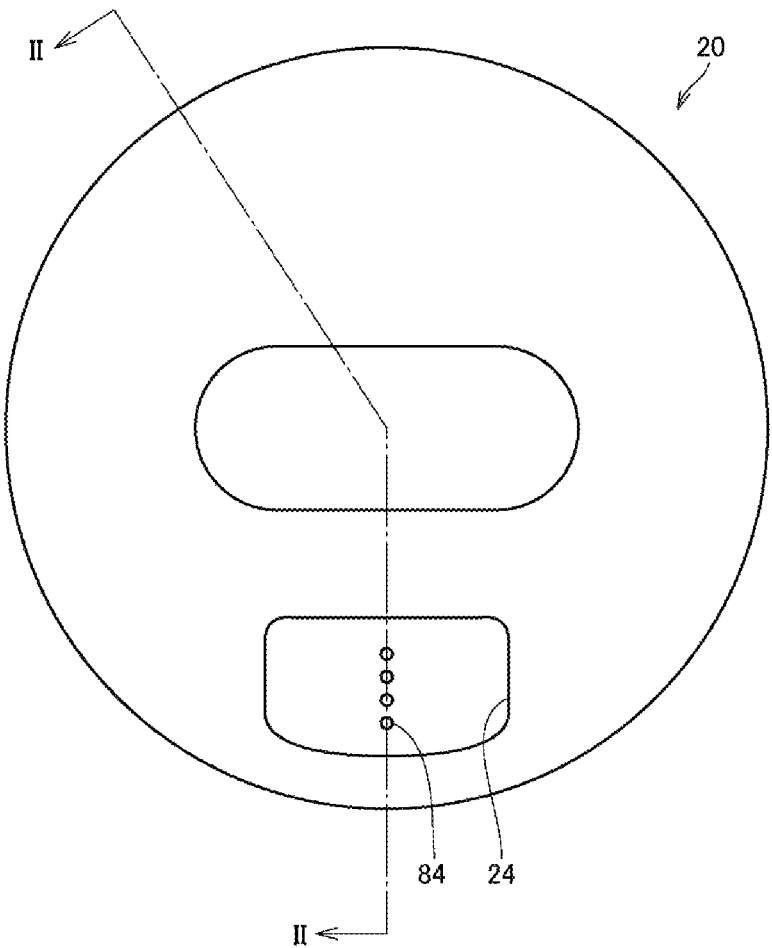
FIG. 1 is a plan view illustrating a schematic structure of a DC brush motor in an embodiment of the present disclosure, as viewed from a non-output side.
Figure 2:
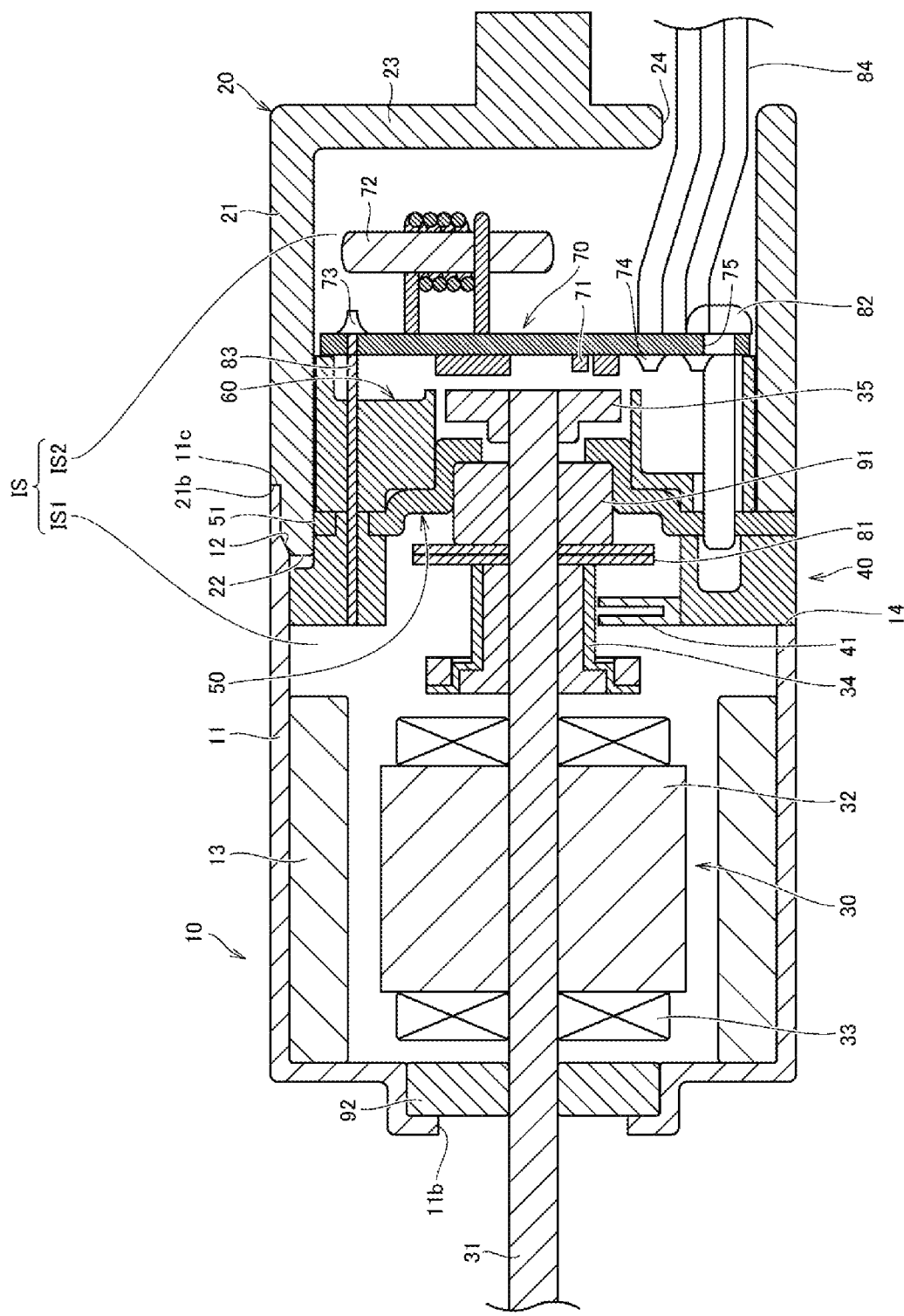
FIG. 2 is a sectional view taken along line II-II of FIG. 1.

FIG. 1 is a plan view illustrating a schematic structure of the DC brush motor in an embodiment of the present disclosure, as viewed from a non-output side. FIG. 2 is a sectional view taken along line II-II of FIG. 1. In a sectional view of the present application, a right side in the view corresponds to the non-output side (one end side along a rotating axis), and a left side in the view corresponds to an output side (another end side along the rotating axis).

With reference to FIGS. 1 and 2, the DC brush motor in the present embodiment mainly includes a frame (motor frame) 10, a cover (protection cover) 20, an armature 30 (an example of the rotor in the present embodiment), a bracket 40, a bottom plate 50 (an example of the partition part in the present embodiment), a circuit board holder 60 (an example of the base plate holder in the present embodiment), and a circuit board 70 (an example of the base plate in the present embodiment).

The frame 10 and the cover 20 form an internal space IS for accommodating the armature 30. The internal space IS is partitioned into a first space IS1 and a second space IS2 by the bottom plate 50 ("bottom" in the bottom plate refers to a position on the non-output side). In the first space IS1, the armature 30 and the bracket 40 are mainly accommodated. In the second space IS2, the circuit board holder 60 and the circuit board 70 are mainly accommodated. While the bottom plate 50 in the present embodiment partitions the internal space IS into the first space IS1 and the second section IS2, besides this, a member for partitioning the internal space IS into two or more spaces and a member across the internal space IS are included in the concept of the partition part.

Figure 3A:
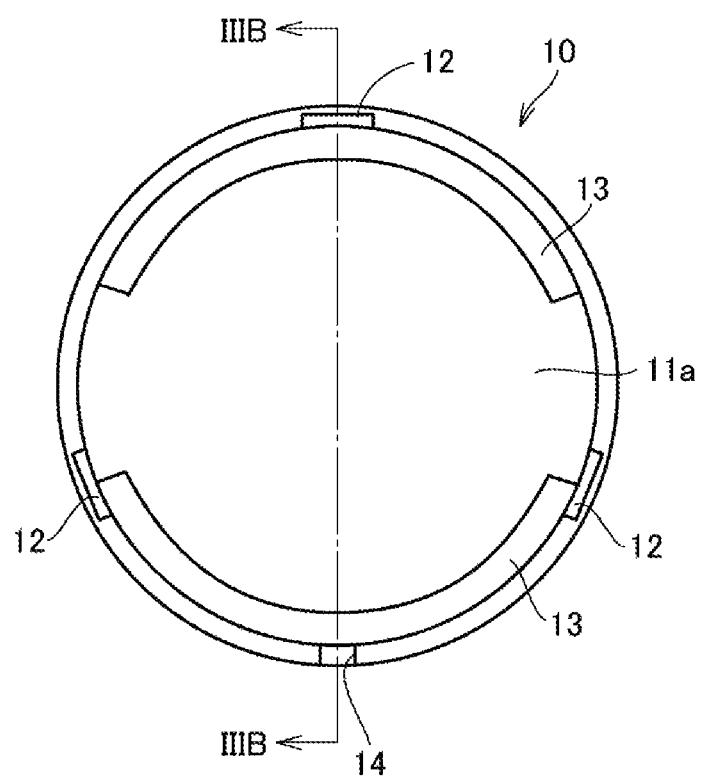
FIGS. 3A and 3B illustrate a structure of a frame 10 in an embodiment of the present disclosure.
Figure 3B:
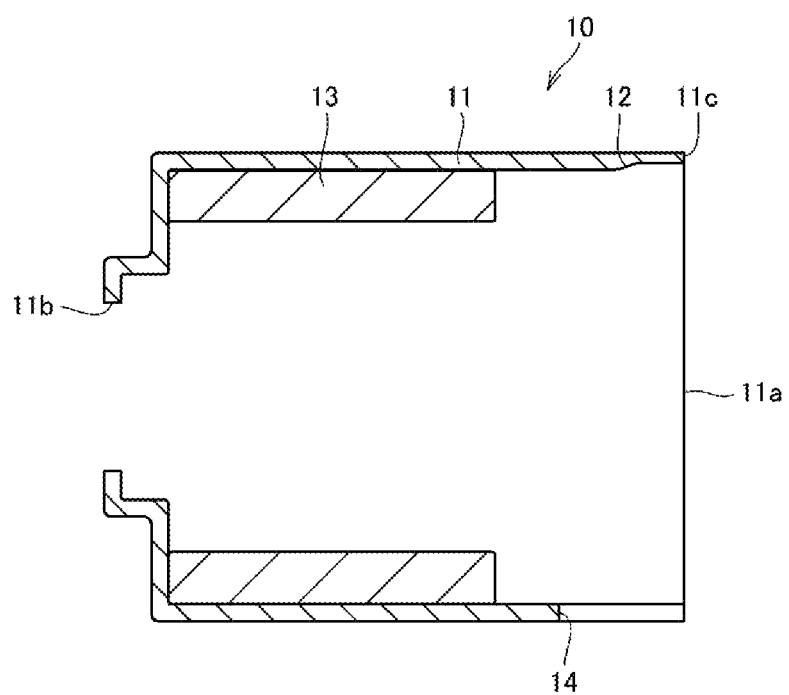

FIGS. 3A and 3B illustrate a structure of the frame 10 in an embodiment of the present disclosure. FIG. 3A is a plan view as viewed from the non-output side, and FIG. 3B is a sectional view taken along line IIIB-IIIB of FIG. 3A.

With reference to FIGS. 2 and 3A, B, the frame 10 includes a frame body 11, a stepped portion 12 (an example of the stepped portion of a frame in the present embodiment), a magnet 13, and a fitting hole 14.

The frame body 11 is in the shape of a cylinder with an inner periphery and an outer periphery, and includes two ends on the non-output side (cover 20 side) and the output side (frame 10 side). One end provided on the non-output side of the frame body 11 includes an opening 11a, and another end provided on the output side thereof includes an opening 11b. Particularly, the opening 11a is a part covered with the cover 20. An end 11c on the non-output side in the frame body 11 is annularly formed, and the opening 11a is formed by the annular end 11c.

The stepped portion 12 is one of three stepped portions 12 provided in an inner surface of the end 11c of the frame body 11. The stepped portion 12 is provided on the opening 11b side with respect to a tip of the end 11c in a direction of a rotating axis of the armature 30. As viewed from the opening 11a, the stepped portion 12 has a recessed shape and is recessed toward the inside of the frame body 11 and toward the output side from the end 11c, and across the stepped portion 12, a part of the frame body 11 on the end 11c side is formed thin and a part of the frame body 11 on the opening 11b side is formed thick. The magnet 13 to be described below is attached to a part of the frame body 11 on the opening 11b side. The three stepped portions 12 are provided on in a circumferential direction of the frame body 11 at equal intervals.

The magnet 13 is fixed to an inner peripheral surface of the frame body 11. The magnet 13 has N-poles and S-poles that are alternately formed in the circumferential direction of the magnet 13 as magnetic poles.

The fitting hole 14 is provided at the bottom of the end 11c in FIG. 3B. The fitting hole 14 is provided to fit with the bracket 40 and the bottom plate 50, and penetrates the frame body 11.

The number of components, such as the stepped portions 12, the magnets 13, and the fitting holes 14, can be optionally set.

Figure 4A:
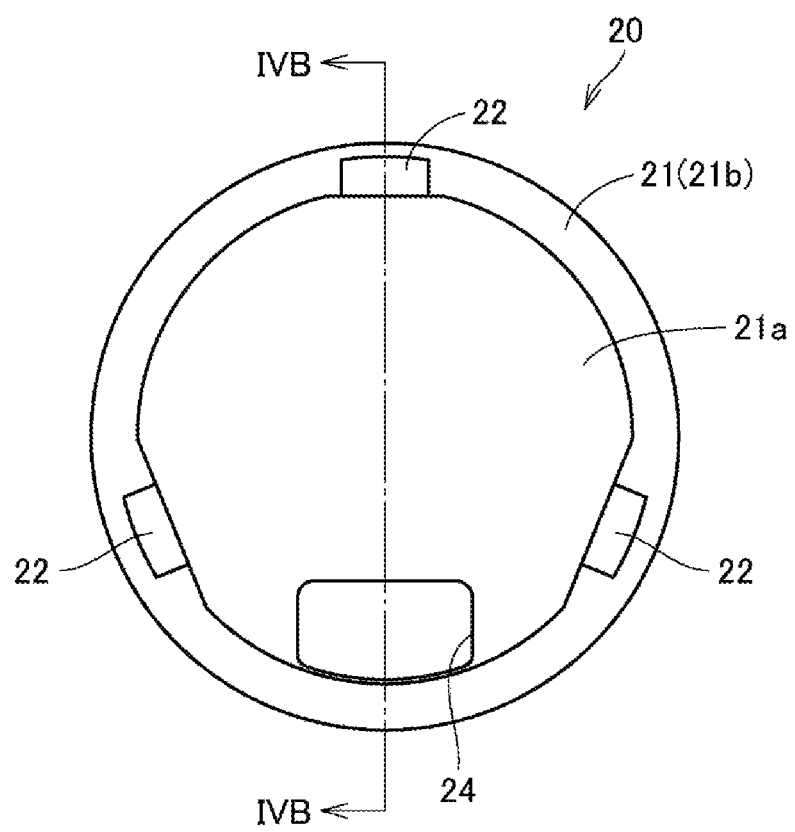
FIGS. 4A and 4B illustrate a structure of a cover 20 in an embodiment of the present disclosure.
Figure 4B:
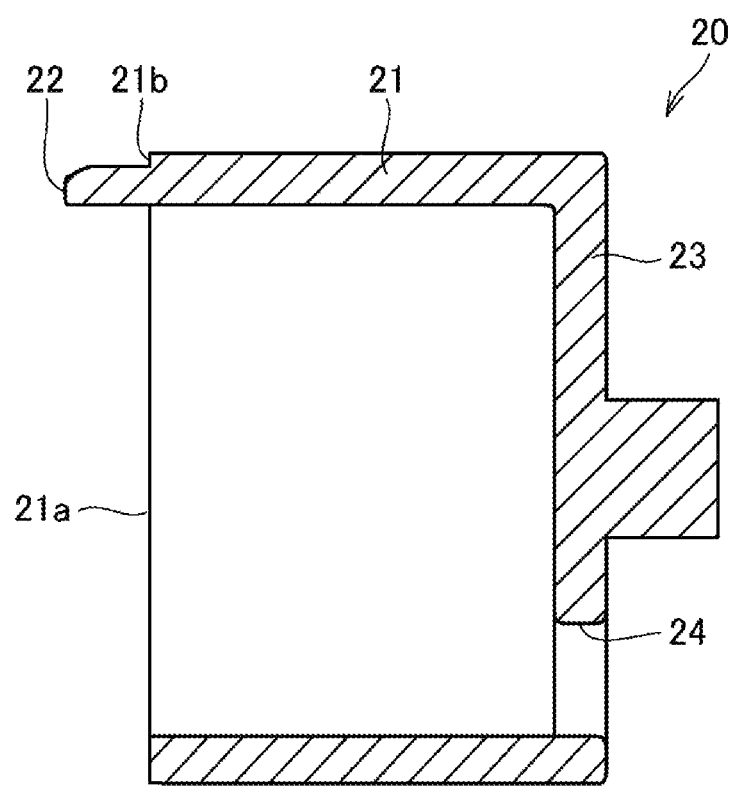

FIGS. 4A and 4B illustrate a structure of the cover 20 in an embodiment of the present disclosure. FIG. 4A is a plan view as viewed from the output side, and FIG. 4B is a sectional view taken along line IVB-IVB of FIG. 4A.

With reference to FIGS. 2 and 4A, B, the cover 20 is provided on the non-output side in the frame 10. The cover 20 has an outer diameter that is substantially identical to that of the frame 10. The cover 20 includes a cylindrical cover body 21, a projecting portion 22, a lid portion 23, and an insertion hole 24 (an example of the first conducting wire insertion hole in the present embodiment).

The cover body 21 is provided on the output side with an opening 21a. The opening 21a is covered with the frame 10, and is defined by an end 21b on the output side of the cover body 21. The end 21b has a circular plane shape as viewed from the output side.

The projecting portion 22 is one of three projecting portions 22 in the present embodiment. The projecting portion 22 is provided inside an outer peripheral side surface of the cover body 21 in a radial direction. The projecting portion 22 projects from the end 21b of the cover body 21 toward the output side (toward the frame body 11). The three projecting portions 22 are provided in a circumferential direction of the cover body 21 at equal intervals. The projecting portions 22 are fitted in the corresponding stepped portions 12 of the frame 10. Specifically, an inner surface of the stepped portion 12 of the frame 10 contacts with an outer surface of the projecting portions 22 of the cover 20. The projecting portion 22 of the cover 20 to be described below is inserted into an insertion portion of a partition part and is disposed in the insertion portion. That is, the inner surface of the stepped portion 12 of the frame 10 is disposed outside the projecting portion 22 of the cover 20, and the insertion portion of the partition part is disposed inside the projecting portion 22 of the cover 20. In addition, the projecting portion 22 of the cover 20 is inserted into a hole formed with the stepped portion 12 of the frame 10 and the insertion portion of the partition part to be disposed in the hole. This structure described above allows the cover 20 to be fixed to the frame 10.

At the time of manufacture, the cover 20 is pressed against the frame 10 in the direction of the rotating axis. This allows the projecting portions 22 of the cover 20 to be inserted into the frame 10.

The cover body 21 is provided on the non-output side of the cover body 21 with the lid portion 23. The lid portion 23 is provided with the insertion hole 24. Conducting wires 84 for supplying electric power to the circuit board 70 from the outside of the internal space IS are inserted into the insertion hole 24. The conducting wires 84 electrically connect an external power source (not illustrated) and the circuit board 70 to each other.

The number of components, such as the projecting portions 22, and the insertion holes 24, can be optionally set.

With reference to FIG. 2, the armature 30 includes a shaft (an example of the rotating axis in the present embodiment) 31, a core 32, a coil 33, a commutator 34, and a FG magnet 35.

The shaft 31 is a rotating axis of the armature 30, and is rotatably supported by a bearing 91 (an example of the bearing in the present embodiment) and a bearing 92. The bearing 91 has rings and balls and is fixed to the bottom plate 50. The bearing 92 has rings and balls and is fixed to the frame body 11 near the opening 11b. A coil spring 81 may be provided between the shaft 31 and the bearing 91. In this case, the coil spring 81 is inserted into the shaft 31.

The core 32 is fixed to an outer peripheral surface of the shaft 31, and faces away from the magnet 13 at a predetermined interval (a minute interval in the present embodiment). An insulating film is formed on the surface of the core 32.

The coil 33 is wound around the core 32.

The commutator 34 is fixed to the outer peripheral surface of the shaft 31 on the non-output side from the core 32.

The FG magnet 35 is provided at an end of the shaft 31 on the non-output side.

Figure 5A:
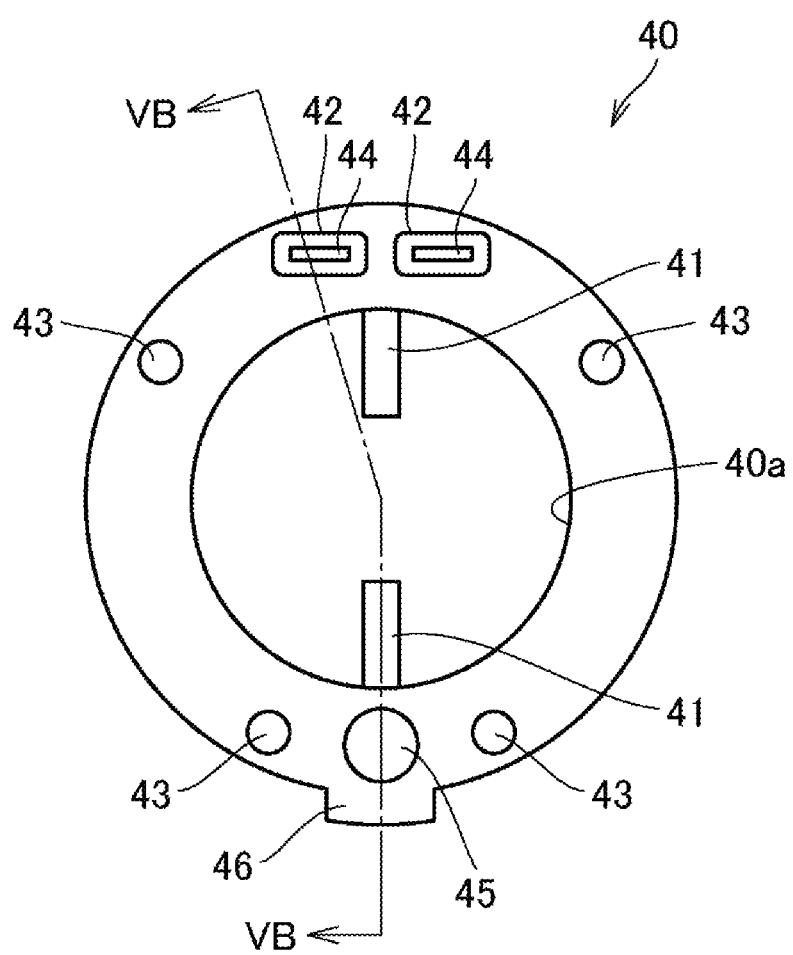
FIGS. 5A and 5B illustrate a structure of a bracket 40 in an embodiment of the present disclosure.
Figure 5B:
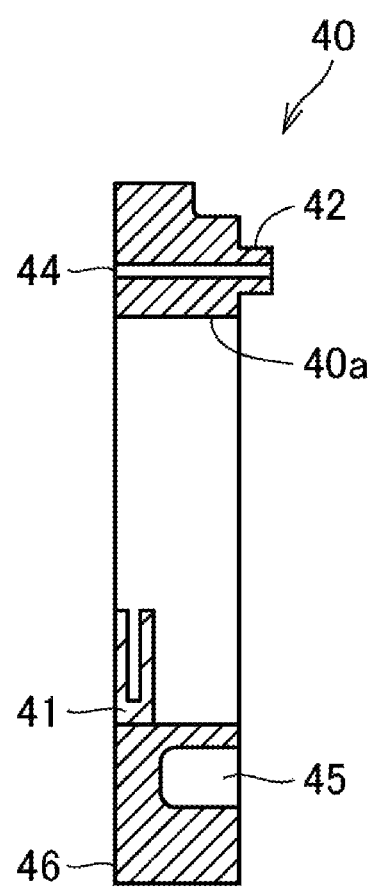

FIGS. 5A and 5B illustrate a structure of the bracket 40 in an embodiment of the present disclosure. FIG. 5A is a plan view as viewed from the non-output side, and FIG. 5B is a sectional view taken along line VB-VB of FIG. 5A.

With reference to FIGS. 2 and 5A, B, the bracket 40 is disposed on the non-output side of the magnet 13 at an interval from the magnet 13. The bracket 40 includes a brush 41, a projecting portions 42 (an example of the projecting portion of the present embodiment) and 43, an insertion hole 44 (an example of the second conducting wire insertion hole of the present embodiment), a recessed portion 45, and an engaging portion 46.

The bracket 40 has a circular plane shape as viewed from the non-output side. At a central portion of the bracket 40, a hole (a central hole in the present embodiment) 40a is formed. The armature 30 is inserted into the central hole 40a across a space.

The brush 41 is one of two brushes 41 disposed in the central hole 40a. The brush 41 is in contact with the commutator 34.

The projecting portion 42 is one of two projecting portions 42 provided in a surface of the bracket 40. The projecting portion 42 projects from the surface of the bracket 40 (surface on a cover 20 side) toward the non-output side. The projecting portion 42 has a rectangular plane shape, for example, and fits in the bottom plate 50. The projecting portion 42 is provided with the insertion hole 44. A part of a terminal 83 for supplying electric power to the brush 41 from the circuit board 70 is inserted into the insertion hole 44. The terminal 83 is formed with a conductive member with conductivity, such as a metal member like aluminum.

The projecting portion 43 is one of four projecting portions 43 projecting from an upper portion of the bracket 40 in FIGS. 5A and 5B toward the non-output side. The bracket 40 is fixed to the bottom plate 50 by mechanical elements such as fitting the projecting portions 42 and 43 in the bottom plate 50, or by welding using ultrasound, for example.

The recessed portion 45 is recessed toward the output side in a lower portion of the bracket 40 in FIGS. 5A and 5B. In the recessed portions 45, a tip of a screw 82 fixing the circuit board 70 to the bottom plate 50 is accommodated.

The engaging portion 46 is formed so as to project radially outward from an outer peripheral side surface of the bracket 40. The engaging portion 46 is fitted into the fitting hole 14 of the frame 10. This performs positioning of the bracket 40 with respect to the frame 10.

The number of components, such as the brushes 41, the projecting portions 42 and 43, the insertion holes 44, the recessed portions 45, and the engaging portions 46, can be optionally set.

Figure 6A:
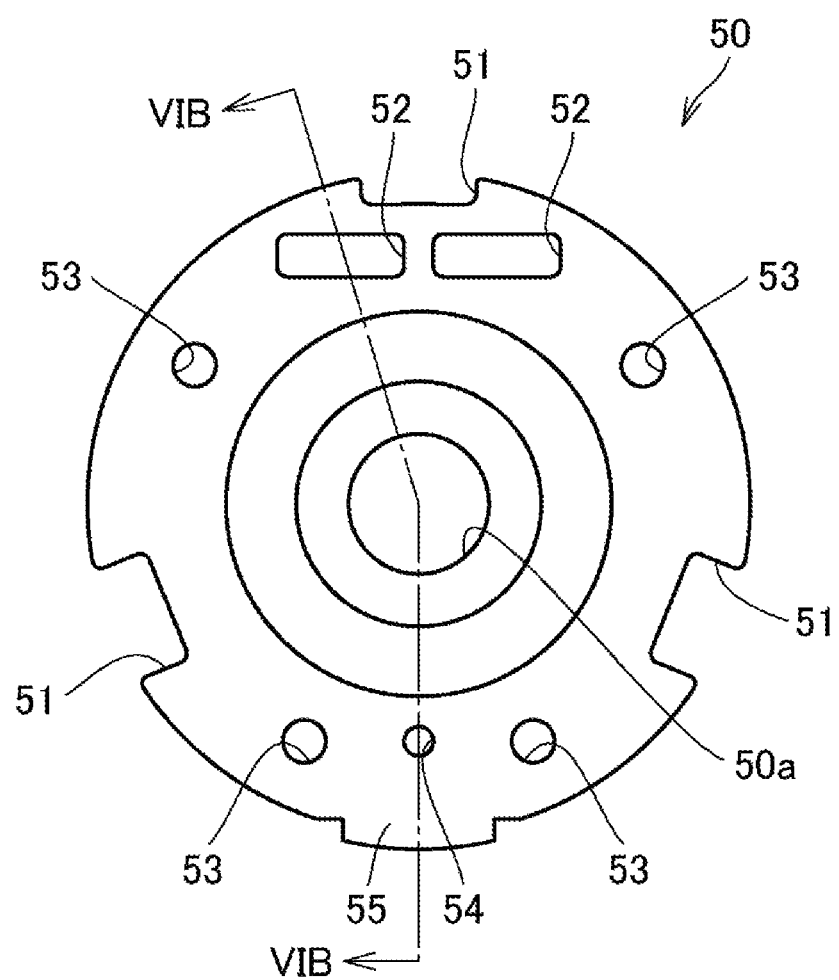
FIGS. 6A and 6B illustrate a structure of a bottom plate 50 in an embodiment of the present disclosure.
Figure 6B:
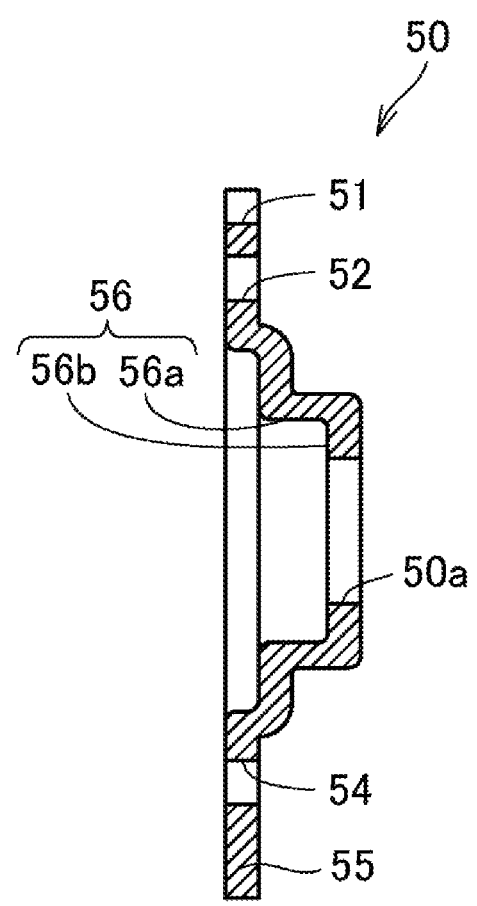

FIGS. 6A and 6B illustrate a structure of the bottom plate 50 in an embodiment of the present disclosure. FIG. 6A is a plan view as viewed from the non-output side, and FIG. 6B is a sectional view taken along line VIB-VIB of FIG. 6A.

With reference to FIGS. 2 and 6A, 6B, the bottom plate 50 is pressed into the frame 10 at a position near an end of the frame 10 on the non-output side, and is in contact with the bracket 40 on the non-output side of the bracket 40. The bottom plate 50 includes a bearing 91, a notch 51 as a first insertion hole (an example of the insertion portion, and an example of the recessed portion, in the present embodiment), fitting holes 52 (an example of the fitting hole in the present embodiment) and 53, a screw hole 54 (an example of the second insertion hole in the present embodiment) with a threaded inner surface as a second insertion hole, an engaging portion 55, and a bearing holding portion 56.

The bottom plate 50 has a substantially circular plane shape as viewed from the non-output side. The plane shape of the bottom plate 50 includes a plurality of recessed portions recessed inward, each of recessed portions is formed with the notch 51. A central hole 50a (an example of the hole in the present embodiment) is formed at the central portion of the bottom plate 50. The shaft 31 is inserted into the central hole 50a across a space.

The notch 51 is one of three notches 51 provided in an outer periphery of the bottom plate 50. The three notches 51 are provided in a circumferential direction of the bottom plate 50 at equal intervals to correspond to the three projecting portions 22 in the cover 20. Three holes are formed between the respective three notches 51 and an inner surface of the frame body 11. The projecting portion 22 in the cover 20 fits into the stepped portion 12 of the frame 10 while inserting into the hole formed with the notch 51 and the frame body 11. This prevents the bottom plate 50 from rotating with respect to the frame 10 in the circumferential direction.

The fitting hole 52 is one of two fitting holes 52, each of fitting holes 52 have a rectangular plane shape, for example. The projecting portion 42 is inserted into the fitting hole 52 to fit into the fitting hole 52.

The fitting hole 53 is one of four fitting holes 53. The projecting portion 43 is fitted into the fitting hole 53. The projecting portions 42 and 43 are fitted into the corresponding fitting holes 52 and 53 to fix the bracket 40 to the bottom plate 50.

The screw hole 54 is provided in a lower portion of the bottom plate 50 in FIG. 6A. The screw 82 (an example of the fixture in the present embodiment) for fixing the circuit board 70 to the bottom plate 50 is inserted into the screw hole 54.

The engaging portion 55 projects radially outward from a lower portion of an outer peripheral surface of the bottom plate 50 in FIG. 6A.

The bearing holding portion 56 is attached to another end of the frame 10 (cover 20 side). A part of the bearing holding portion 56 is accommodated in the cover 20. The bearing holding portion 56 holds the bearing 91 at a position of the other end of the frame 10. Specifically, the bearing holding portion 56 includes a portion 56a projecting in a non-output direction, and an end 56b extending inside an end of the portion 56a on the non-output side, in the radial direction. An inner peripheral surface of the portion 56a is in contact with an outer peripheral surface of the bearing 91, and an end of the bearing 91 on the non-output side is in contact with an end surface of the end 56b on the output side. The central hole 50a is provided inside the bearing holding portion 56 in the radial direction.

Figure 7:
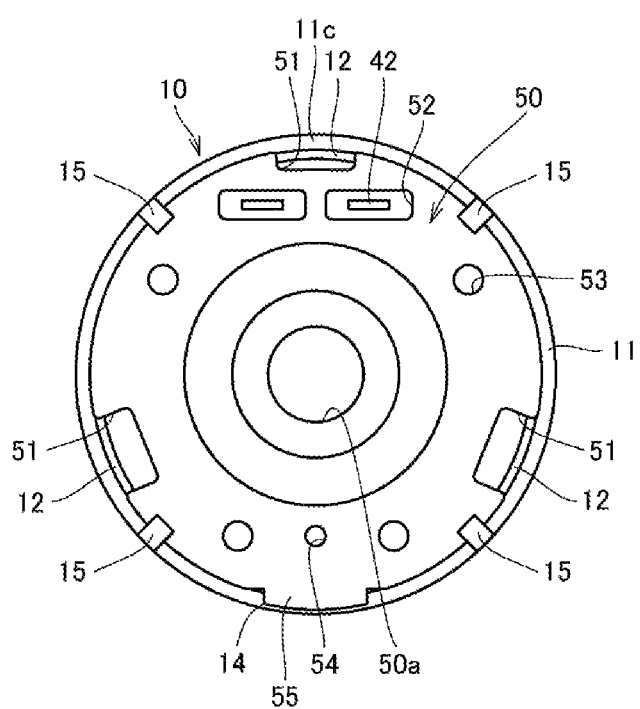
FIG. 7 is a plan view illustrating the bottom plate 50 that is fixed to the frame 10 in an embodiment of the present disclosure, as viewed from the non-output side.

FIG. 7 is a plan view illustrating the bottom plate 50 that is fixed to the frame 10 in an embodiment of the present disclosure, as viewed from the non-output side. In FIG. 7, members existing on the non-output side from the bottom plate 50 are eliminated.

With reference to FIGS. 2 and 7, the frame 10 further includes a crimping portion 15 formed by cutting a part of the frame body 11 and raising it inward (central hole 50a side). The crimping portion 15 is one of four crimping portions 15. The bottom plate 50 is fixed to the frame 10 by being crimped with the crimping portions 15.

The bottom plate 50 includes a projecting portion (hereinafter referred to as an engaging portion) projecting outward from the outer periphery of the bottom plate 50. This engaging portion 55 engages with the fitting hole 14 of the frame 10. Positioning of the bottom plate 50 with respect to the frame 10 is performed by engaging the engaging portion 55 with the fitting hole 14. The outer periphery of the bottom plate 50 other than the engaging portion 55 is in contact with the inner surface of the frame 10, or is disposed inside the inner surface.

The number of components, such as the notches 51, the fitting holes 52 and 53, the screw holes 54, the engaging portions 55, and the crimping portions 15, can be optionally set.

Figure 8A:
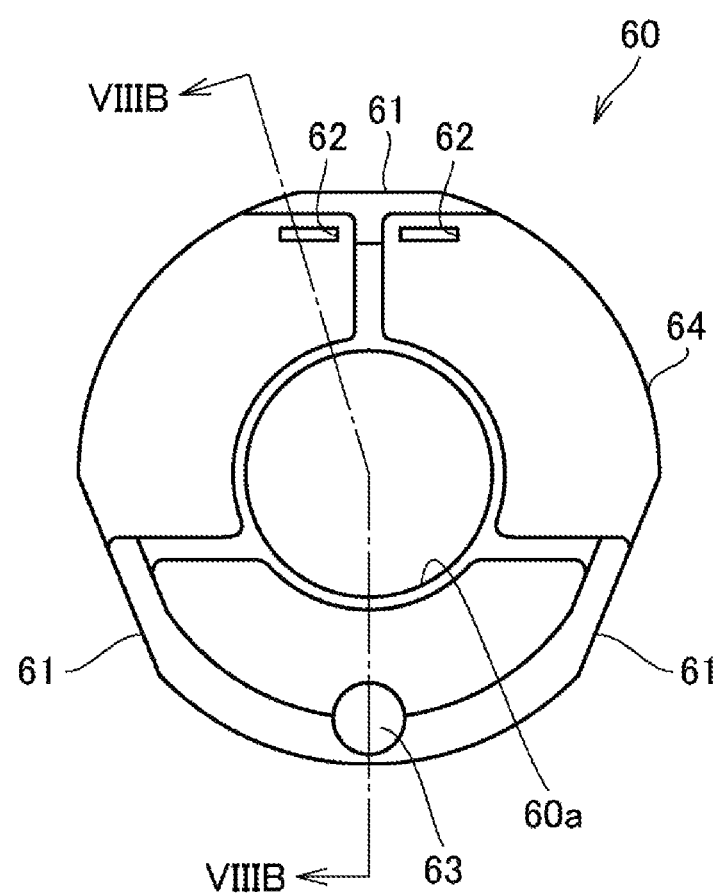
FIGS. 8A and 8B illustrate a structure of a circuit board holder 60 in an embodiment of the present disclosure.
Figure 8B:
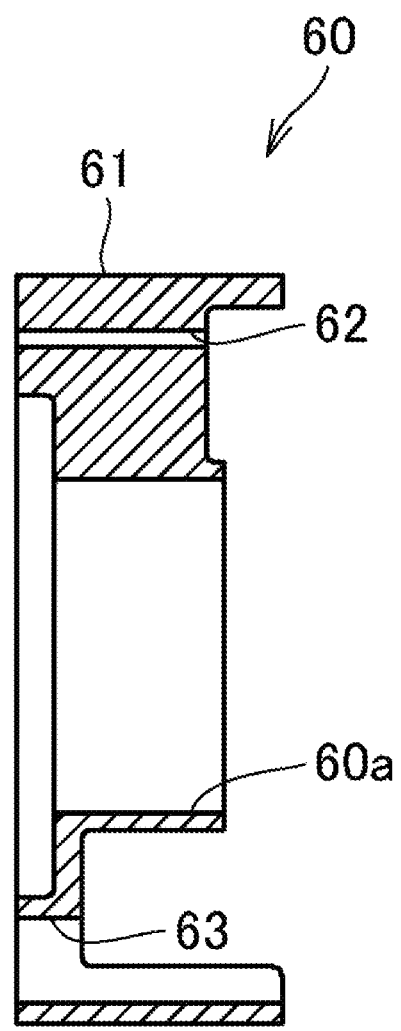

FIGS. 8A and 8B illustrate a structure of the circuit board holder 60 in an embodiment of the present disclosure. FIG. 8A is a plan view as viewed from the non-output side, and FIG. 8B is a sectional view taken along line VIIIB-VIIIB of FIG. 8A.

With reference to FIGS. 2 and 8A, B, the circuit board holder 60 is in contact with the bottom plate 50 on the non-output side of the bottom plate 50. The circuit board holder 60 includes a notch 61, an insertion hole 62, and a screw hole 63.

The circuit board holder 60 has a substantially circular plane shape as viewed from the non-output side. A central hole 60a is formed at the center of the circuit board holder 60. The shaft 31 is inserted into the central hole 60a across a space.

A contour 64 (referred to as also an outer periphery) of the circuit board holder 60 includes a portion (a first curved portion in the present embodiment) along a circle (first circle) with a predetermined outer diameter, and a portion deviated from the circle (a linear portion in the present embodiment). The notch 61 corresponds to the linear portion. The portion deviated from the circle may be a portion forming a contour different from contour of the first curved portion, such as a second curved portion along a circle (second circle) with a different outer diameter, besides the linear portion.

The notch 61 is one of three notches 61 provided in an outer periphery of the circuit board holder 60. The three notches 61 are provided in a circumferential direction of the circuit board holder 60 at equal intervals.

The insertion hole 62 is one of two insertion holes 62 provided in an upper portion of the circuit board holder 60. The terminal 83 is inserted into the insertion hole 62.

The screw hole 63 is provided in a lower portion of the circuit board holder 60 in FIG. 8A. The screw 82 is inserted into the screw hole 63.

The number of components, such as the notches 61, the insertion holes 62, and the screw holes 63, can be optionally set.

With reference to FIG. 2, the circuit board 70 is in contact with the circuit board holder 60 on the non-output side of the circuit board holder 60. The circuit board 70 is disposed on the cover 20 side with respect to the bottom plate 50 (from the bottom plate 50). The circuit board 70 includes a magnetic sensor 71, a toroidal coil 72, terminals 73 and 74, and a screw hole 75, for example. The magnetic sensor 71 detects rotation speed of the armature 30 on the basis of change in a magnetic field with rotation of the FG magnet 35. The toroidal coil 72 is configured to secure Electro-Magnetic Compatibility (EMC). An end of the terminal 83 is soldered to the terminal 73, and an end of the conducting wire 84 is soldered to the terminal 74.

The screw hole 75 is provided in a lower portion of the circuit board 70 in FIG. 2. The screw 82 is inserted into the screw hole 75. This allows the circuit board 70 to be fixed to the bottom plate 50 in the second space IS2. The screw 82 also serves to reduce noise.

According to the present embodiment, the projecting portion 22 of the cover 20 engages with the stepped portion 12 of the frame 10 while being inserted into the notch 51 of the bottom plate 50. This prevents the frame 10 from rotating in the circumferential direction to prevent the cover 20 from coming off from the frame 10. As a result, malfunction can be prevented from occurring. In addition, since a mechanism for preventing rotating of the frame 10 can be provided without protruding from the frame 10 and the cover 20, the motor can be reduced in size.

It is preferable that the insertion portion provided in the partition part is a notch provided in an outer periphery of the partition part in that large resistant force against turning force can be acquired. Meanwhile, the insertion portion may be any portion into which the cover is inserted, and thus may be a hole provided in the partition part besides the notch provided in the outer periphery of the partition part.

While the circuit board 70 is described as an example of the base plate in the present embodiment, the base plate is not limited to this, and thus a sealing base plate and a metal base plate forming a heat sink are applicable, for example.

In the present embodiment, the bracket 40 and the bottom plate 50 are fitted to each other by using the fitting hole 14 provided in a lower portion of the end 11c. Besides this, the bracket 40 and the bottom plate 50 may be fixed to each other by welding, for example, without providing the fitting hole 14.

While the three projecting portions 22 are provided in the circumferential direction of the cover body 21 at equal intervals, besides this, the projecting portions 22 may be provided at different intervals in the circumferential direction.

While the three notches 51 are provided in the circumferential direction of the bottom plate 50 at equal intervals, besides this, the notches 51 may be provided at different intervals in the circumferential direction.

While the three notches 61 are provided in the circumferential direction of the circuit board holder 60 at equal intervals, besides this, the notches 61 may be provided at different intervals.

In the present embodiment, the projecting portion 22 of the cover 20 engages with the stepped portion 12 of the frame 10 while being inserted into the notch 51 of the bottom plate 50. Structures are not limited to this. For example, the cover 20 may be fixed to the frame 10 without providing the stepped portion 12 while an inner surface of the frame body 11 with no stepped portion is opposed to the projecting portions 22 of the cover 20, and the projecting portions 22 are inserted into the corresponding notches 51 of the bottom plate 50. Even the structure described above enables the cover to be prevented from coming off from the frame even if rotating force of the motor is transmitted to the frame. In addition, the cover can bear the turning force acting on the frame.

The bracket 40 may have the following structure instead of the structure illustrated in FIGS. 5A and 5B.

Figure 9A:
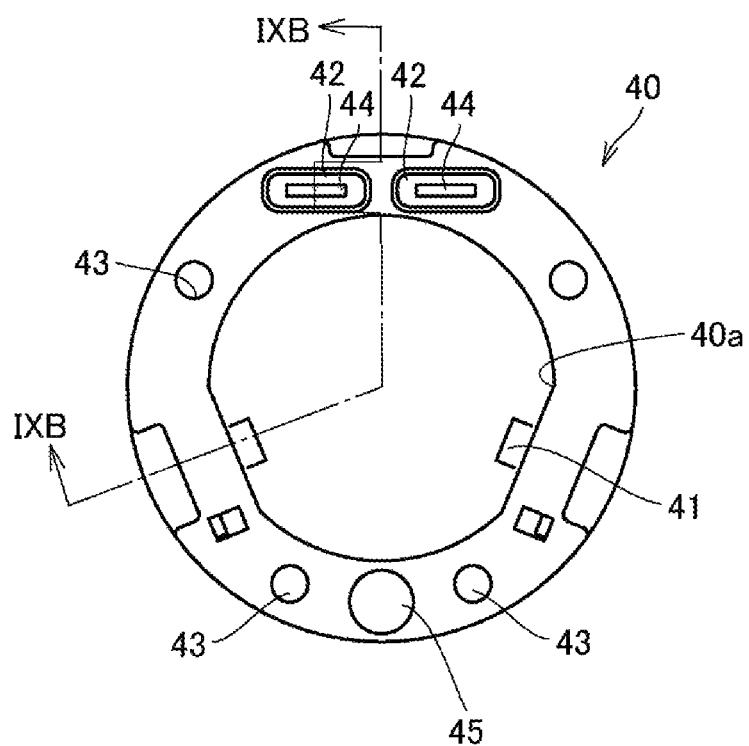
FIGS. 9A to 9C illustrate a structure of a bracket 40 in a modification of an embodiment of the present disclosure.
Figure 9B:
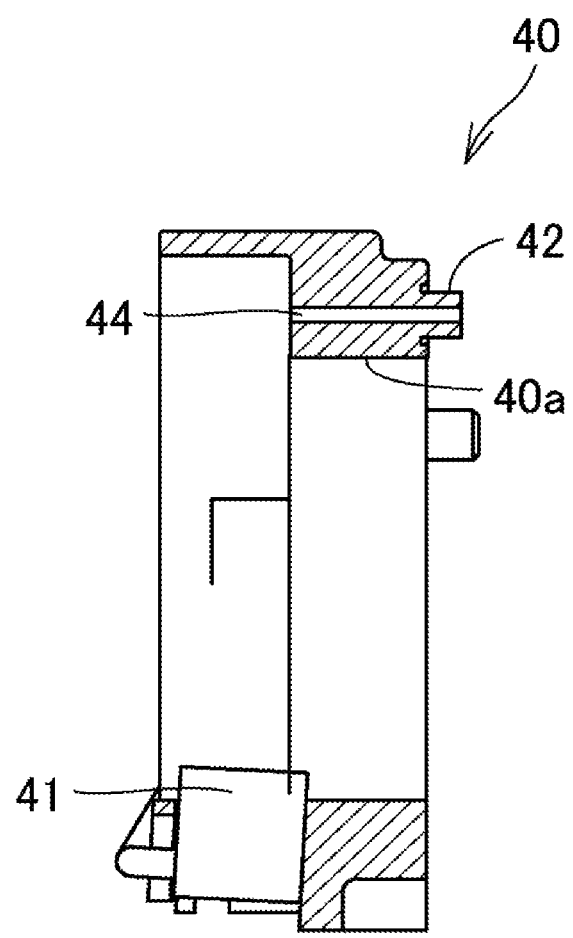
Figure 9C:
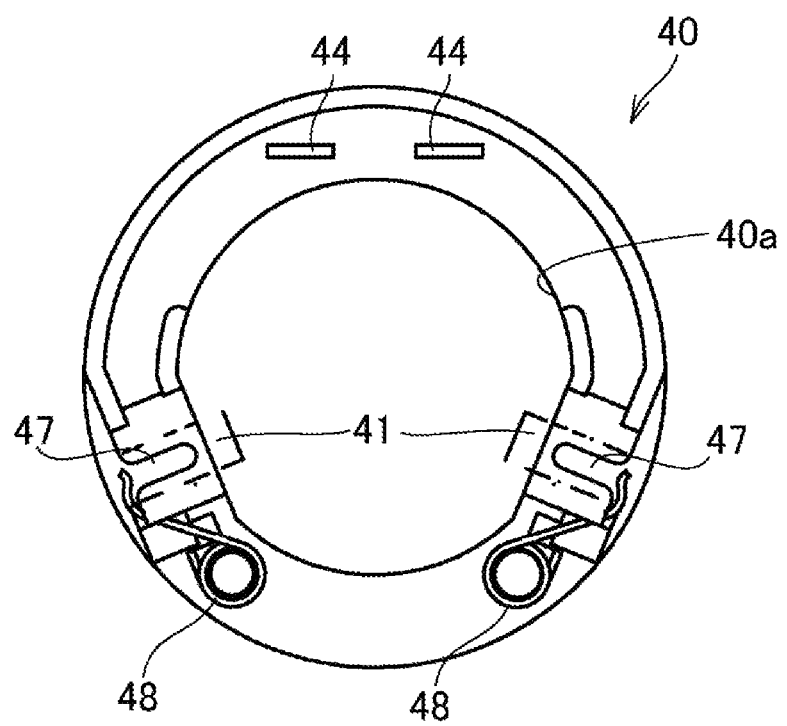

FIGS. 9A to 9C illustrate a structure of a bracket 40 in a modification of an embodiment of the present disclosure. FIG. 9A is a plan view as viewed from the non-output side, FIG. 9B is a sectional view taken along line IXB-IXB of FIG. 9A, and FIG. 9C is a plan view as viewed from the output side.

With reference to FIGS. 9A to 9C, the bracket 40 in the present modification includes a brush 41, projecting portions 42 and 43, an insertion hole 44, a recessed portion 45, a brush holder 47, and a coil spring 48. The bracket 40 in the present modification includes no structure corresponding to the engaging portion 46 of FIGS. 5A and 5B.

Here, there are two brushes 41 respectively disposed in the corresponding lower right portion and lower left portion in a central hole 40a in FIG. 5A. The brush 41 is inserted into the brush holder 47 of the bracket 40 in a slidable manner. The brush 41 is pressed against the commutator 34 by the coil spring 48 to cause the brush 41 to be in contact with the commutator 34.

Since the structure of the bracket 40 other than that described above is almost identical to the structure of the bracket 40 illustrated in FIGS. 5A and 5B, the same member is designated by the same reference numeral so that description of the member is not repeated.

In a conventional art, rotating force of an armature is transmitted to a frame during driving of a motor to cause rotational torque in the frame. This rotational torque causes a notch of the frame to come off from a projecting portion of a cover, and then a protrusion of the cover sometimes ascends an outer peripheral surface of the frame. In this case, electronic components constituting a control signal control unit are not covered with the cover. As a result, the electronic components are insufficiently protected to cause malfunction such as failure in an encoder or the like, and a break in wiring, to easily occur. According to the present embodiment, the frame can be prevented from coming off from the cover, and thus malfunction caused by the cover coming off from the frame is prevented.

The above embodiments each are to be considered to be an example in every point and to be not restrictive. The scope of the present disclosure is shown in the scope of claims instead of the above description, and is intended to include meaning equivalent to the scope of claims and all modifications in the scope of claims.

What is claimed is:

1. A motor comprising:
   a rotor;
   a frame accommodating the rotor;
   a cover provided at one of two ends of the frame in a rotating axis direction of the rotor;
   an internal space formed by the frame and the cover; and
   a partition part that partitions the internal space into two spaces and that includes insertion portions, wherein:
   the frame includes a magnet,
   parts of the cover project in the rotating axis direction from an end of a body of the cover toward the one of the two ends of the frame,
   parts of an inner surface of the frame are recessed in a radial direction,
   the parts of the cover are arranged to be inside of holes formed by the parts of the inner surface of the frame and the insertion portions,
   the parts of the cover are fitted into the parts of the inner surface of the frame in a circumferential direction, and
   the partition part is fixed to the frame in the circumferential direction.

2. The motor according to claim 1, comprising a shaft as a rotating axis of the rotor, wherein
   the partition part includes a bearing, a bearing holding portion holding the bearing, and a hole provided inside an inner surface of the bearing holding portion, and
   the shaft is inserted into the hole.

3. The motor according to claim 1, wherein
   the frame includes a cylindrical frame body having two ends,
   stepped portions are provided in an inner surface of one of the two ends of the cylindrical frame body,
   the cover body has a cylindrical shape, and
   the parts of the cover are located inside the stepped portions.

4. The motor according to claim 3, wherein
   the insertion portions are recessed parts provided in an outer periphery of the partition part.

5. The motor according to claim 1, wherein
   the partition part includes a substantially circular plane shape,
   the plane shape includes recessed portions, and
   the recessed portions are recessed inward.

6. The motor according to claim 1, comprising:
   a base plate fixed to the partition part, wherein
   the base plate is disposed on a same side with respect to the partition part as the cover.

7. The motor according to claim 6, wherein
   the insertion portions include a first insertion hole and a second insertion hole, and
   a fixture fixing the base plate to the partition part is inserted into the second insertion hole.

8. The motor according to claim 6, wherein
   the cover includes a conducting wire insertion hole provided on one end side of the cover in the rotating axis direction,
   electric power is supplied via a conducting wire to the base plate from outside the internal space, and
   the conducting wire is inserted into the conducting wire insertion hole.

9. The motor according to claim 6, comprising:
   a bracket fixed to the frame in a space on one end side of the cover,
   the bracket including:

a projecting portion;
a brush; and
a conducting wire insertion hole provided in the projecting portion, and a conducting wire, wherein
electric power is supplied via the conducting wire to the brush from the base plate,
the conducting wire is inserted into the conducting wire insertion hole, and
the partition part includes a fitting hole fitted into the projecting portion.

10. A motor comprising:
a rotor;
a frame accommodating the rotor;
a cover provided at one of two ends of the frame in a rotating axis direction of the rotor;
an internal space formed by the frame and the cover; and
a partition part that partitions the internal space into two spaces and that includes insertion portions, wherein:
the frame includes a magnet,
parts of the cover project in the rotating axis direction from an end of a body of the cover toward the one of the two ends of the frame,
parts of an inner surface of the frame are recessed in a radial direction,
the insertion portions are recessed parts of an outer circumferential part of the partition part,
the parts of the cover are arranged to be inside of holes formed by the parts of the inner surface of the frame and the insertion portions,
the parts of the cover are fitted into the parts of the inner surface of the frame in a circumferential direction, and
the partition part is fixed to the frame in the circumferential direction.

11. A motor comprising:
a rotor;
a frame accommodating the rotor;
a cover provided at one of two ends of the frame in a rotating axis direction of the rotor;
an internal space formed by the frame and the cover; and
a partition part that partitions the internal space into two spaces and that includes insertion portions, wherein:
the frame includes a magnet,
parts of the cover project in the rotating axis direction from an end of a body of the cover toward the one of the two ends of the frame,
parts of an inner surface of the frame are recessed in a radial direction,
the insertion portions are recessed parts of an outer circumferential part of the partition part,
the parts of the cover are arranged to be inside of holes formed by the parts of the inner surface of the frame and the insertion portions,
the parts of the cover are fitted into and contact the parts of the inner surface of the frame in a circumferential direction, and
the partition part is fixed to the frame in the circumferential direction.

12. A motor comprising:
a rotor;
a frame accommodating the rotor;
a cover provided at one of two ends of the frame in a rotating axis direction of the rotor;
an internal space formed by the frame and the cover; and
a partition part that partitions the internal space into two spaces and that includes insertion portions, wherein:
the frame includes a magnet,
parts of the cover project in the rotating axis direction from an end of a body of the cover toward the one of the two ends of the frame,
parts of an inner surface of the frame are recessed in a radial direction,
an outer periphery of the insertion portions includes concave surfaces in the circumferential direction,
the parts of the cover are arranged to be inside of holes formed by the parts of the inner surface of the frame and the insertion portions,
the parts of the cover are fitted into the parts of the inner surface of the frame in a circumferential direction,
the partition part is fixed to the frame in the circumferential direction.

* * * * *